Jan. 4, 1966     D. M. WATKINS     3,226,743
FLUTELESS TAPS
Filed Dec. 19, 1961

United States Patent Office 3,226,743
Patented Jan. 4, 1966

3,226,743
FLUTELESS TAPS
Douglas Mackenzie Watkins, Edmonton, London, England, assignor to The British Tap & Die Company, London, England, a British company
Filed Dec. 19, 1961, Ser. No. 160,566
5 Claims. (Cl. 10—152)

Fluteless taps are taps which do not cut threads but act by deforming the wall of a cylindrical bore without deliberately removing any material. They are accordingly applicable only to fairly ductile materials, for example brass, copper and aluminium.

A fluteless tap according to the present invention has a completely formed thread (that is to say, a thread which has a uniform cross-section as seen in plates lying along the axis of the tap) which has two or more (but preferably not more than eight) circumferentially spaced crests as viewed in a cross-section through the tap, each crest being at the junction of a steeply relieved leading part and a steeply or progressively relieved trailing part, the trailing part being preferably progressively relieved.

By "progressively relieved trailing part" is meant a part of which the radius from the axis of the tap decreases slowly moving circumferentially from the crest in a direction opposite to the direction of rotation of the tap when forming a thread. The relief, that is to say the decrease in radius, preferably varies substantially in proportion to the circumferential distance from the crest.

The steeply relieved leading part may be straight or slightly concave, or even very slightly convex. The rate of relief in a direction going circumferentially away from the crest is, however, preferably substantially greater than the rate of relief of the trailing part.

Taps according to the present invention have less tendency to "skurf" than fluteless taps proposed hitherto. That is to say, they have less tendency to rub off the article being tapped small quantities of material in the form of a fine powder. The reason for this is that taps according to the present invention have no substantial surfaces either at the crest, or lying between the crests, which move along the same path while the tap is forming a thread. Instead the taps have relatively sharp crests, the axial extent of the thread being less at any point between the crests than at the crests for any given radius. In the case of a tap with steeply relieved trailing parts there is less tendency to skurf than there is with taps proposed hitherto, but we have found that steeply relieved trailing parts increase the frictional resistance to tapping as compared with taps with progressively relieved trailing parts.

A tap according to the present invention may have crests confined to a tip portion, with normal screw threads further back from the tip portion. However, for ease of manufacture the whole thread is preferably formed with crests. There may be a taper at the tip so that the end of the tap will just fit into a hole of the appropriate diameter for tapping, in which case the threads are nevertheless preferably completely formed all the way to the end though of a decreasing diameter; alternatively for blind holes a tap may be parallel-sided all the way to the end. As no material is removed during tapping (disregarding any very small quantity which may be removed by scurfing) the appropriate diameter for a hole to be tapped will in each case naturally be slightly larger than the root diameter of the thread.

The preferred dimensions of taps according to this invention may be expressed in terms of the diameter of the tap (i.e. the diameter at the outer edges of the crests) and the amount by which the minimum diameter (that is to say the diameter of a cylinder passing through the outer edges of the threads at the points of greatest relief) is smaller than the tap diameter. This amount may be termed the "relief of diameter." The outer edge of the leading part of each crest may be regarded as lying substantially on a straight line passing through the crest tangentially to the minimum diameter, and the progressively relieved trailing part of the adjacent crest may extend from the point at which the straight line meets the minimum diameter, or from a point on the minimum diameter closer to the adjacent crest. The following are examples of preferred values for taps having four crests:

| Tap diameter (inches): | Relief of diameter (inches) |
|---|---|
| ⅛ | .001–.005 |
| ¼ | .003–.008 |
| ½ | .005–.015 |
| 1 | .010–.040 |

The threads on taps according to the present invention can conventiently be ground from blanks without any previous rough shaping of the threads. A grinding wheel for this purpose should be as large as possible and preferably has a diameter of between 14½ and 16 inches. The wheel may be wide enough to include several thread-forming ridges having a shape complementary to the thread to be ground on the tap.

Movement to the grinding wheel towards and away from the axis of the tap is preferably produced by a single-throw rotary cam rotating at a speed which is a multiple of the speed of rotation of the blank, the multiple being equal to the number of crests to be formed on the blank. For example, if the tap is to have four crests then the cam rotates at four times the speed of the blank. This ensures that the crests are all identical. Alternatively a tap with four crests could be ground using a two-throw or four-throw rotary cam, in which case the cam would rotate at twice the speed or exactly the speed of the blank.

An example of a tap and of a cam for use in grinding taps according to the present invention are shown in the accompanying drawings. In these drawings.

The tap has an unthreaded driven end 2 which during use is secured in a device for driving the tap. The operative end of the tap has a slightly tapered tip 4 and a completely formed thread 6, the whole thread being formed with crests.

Figure 2:
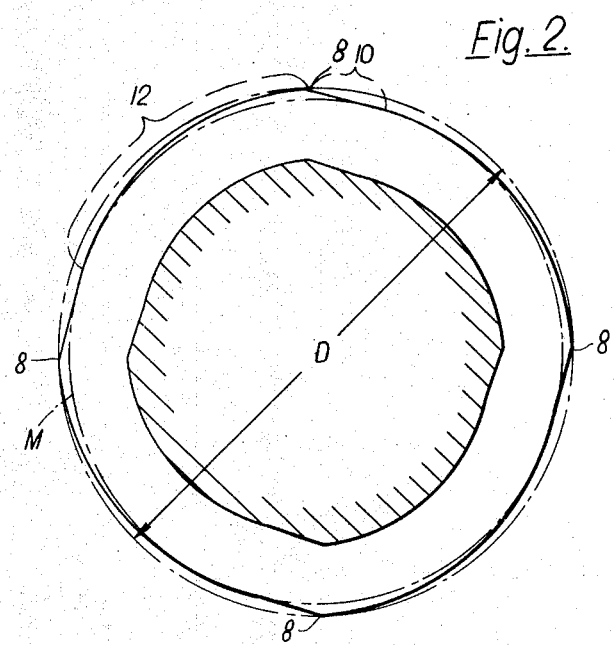
FIGURE 2 is a cross-section, which for convenience is taken in a helix through th centre of the helical valley between two adjacent turns of the threads.

As shown in FIGURE 2, the tap has four circumferentially spaced crests 8. Each crest is at the junction of a steeply relieved leading part 10 and a progressively relieved trailing part 12. The tap diameter is the dimension D. It will be seen that the outer edge of the leading part 10 is substantially a straight line passing through the crest tangentially to a circle M which has the minimum diameter of the tap. The outer edge of the progressively relieved trailing part 12 extends from the crest to a point at about the junction of the circle M with the outer edge of the leading part of the adjacent crest. The relief of diameter, that is to say the difference between the dimension D and the diameter of the circle M, is shown slightly exaggerated in FIGURE 2 for the sake of clarity.

Figure 1:
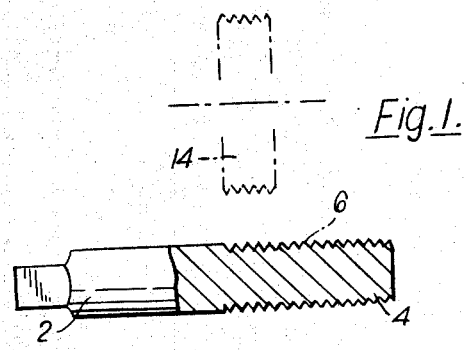
FIGURE 1 is a longitudinal section of the threaded part of the tap.

A grinding wheel 14 is shown in broken outlines in FIGURE 1. Movement of the grinding wheel towards and away from the axis of the blank during grinding is produced by a rotary cam 16 which acts on a follower 18 (shown diagrammatically). The follower consists essentially of an arm pivoted on a pin 20, the right-hand end of the arm (not shown) being arranged to control the lateral movement of the grinding wheel.

Figure 3:
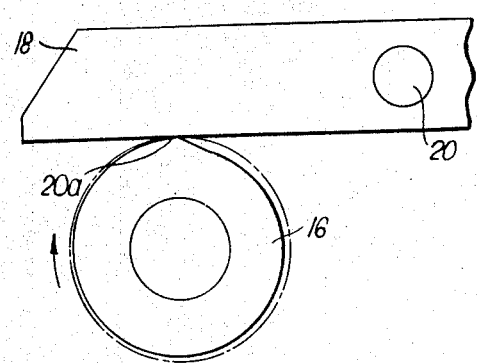
FIGURE 3 shows the cam.

During grinding the grinding wheel is fed axially into the blank from the tip of the blank. It will be seen that the cam is relieved progressively on one side of a crest 20a and steeply on the other side of the crest. It rotates in a clockwise direction so that the follower, starting with the cam position shown in FIGURE 3, moves slowly in one direction during the greater part of the period of rotation of the cam, during which time the wheel is moved into the blank, and grinds the progressively relieved trailing part of one of the crests. As soon as the steeply relieved leading part of the cam reaches the follower, the movement of the follower is reversed suddenly so that the grinding wheel is withdrawn rapidly from the blank so as to leave a steeply relieved part having substantially the shape of the wheel. In the case of a 16 inch wheel the steeply relieved part which is ground onto the tap is virtually a straight line. As the rate of feed of the wheel into the blank is slow, excessive heating can be easily avoided.

The follower may be arranged as a reduction lever so as to impart less movement to the grinding wheel than it receives at its point of contact with the cam. This enables the cam to be made with more relief than the taps which are to be ground.

I claim:

1. A fluteless tap having a central axis and a completely formed thread which varies in its distance from said axis so as to present at least two circumferentially spaced crests, as viewed in a cross-section normal to said axis, each crest being formed by the junction of a steeply relieved leading part and a progressively relieved trailing part, the relief of which begins at the junction with the steeply relieved leading part, whereby the thread is at a maximum distance from the axis of the tap only at sharp crests and consequently minimizes the cutting torque required.

2. A tap according to claim 1 in which the steeply relieved leading part at each crest is substantially straight.

3. A tap according to claim 1, in which the relief of each trailing part varies substantially in proportion to the circumferential distance from the crest.

4. A tap according to claim 1 in which the whole thread on the tap is formed with crests.

5. A tap according to claim 1 of which the tip is tapered and in which the thread is completely formed all the way to the end of the tap.

References Cited by the Examiner

UNITED STATES PATENTS

| 2,536,864 | 1/1951 | Strickland et al. | 51—288 |
| 2,807,813 | 10/1957 | Welles | 10—152 |
| 2,981,038 | 4/1961 | Flanders | 51—288 |
| 2,991,491 | 7/1961 | Welles | 10—152 |

FOREIGN PATENTS 210,236  7/1960  Austria.

ANDREW R. JUHASZ, *Primary Examiner.*